United States Patent
Nam et al.

(10) Patent No.: US 11,203,326 B2
(45) Date of Patent: Dec. 21, 2021

(54) SENSOR CLEANING DEVICE AND AUTONOMOUS VEHICLE THEREOF

(71) Applicants: HYUNDAI MOTOR COMPANY, Seoul (KR); Kia Motors Corporation, Seoul (KR)

(72) Inventors: Geun-Hyung Nam, Hwaseong-si (KR); Dong-Ha Kim, Seoul (KR); Eun-Soo Park, Seoul (KR); Tae-Woong Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 316 days.

(21) Appl. No.: 16/423,517

(22) Filed: May 28, 2019

(65) Prior Publication Data
US 2020/0108797 A1   Apr. 9, 2020

(30) Foreign Application Priority Data
Oct. 8, 2018   (KR) .................. 10-2018-0119712

(51) Int. Cl.
| | |
|---|---|
| *B60S 1/26* | (2006.01) |
| *B60S 1/56* | (2006.01) |
| *B60S 1/52* | (2006.01) |
| *G05D 1/02* | (2020.01) |
| *B60S 1/08* | (2006.01) |

(52) U.S. Cl.
CPC . *B60S 1/26* (2013.01); *B60S 1/08* (2013.01); *B60S 1/52* (2013.01); *B60S 1/56* (2013.01); *G05D 1/0231* (2013.01); *G05D 2201/0213* (2013.01)

(58) Field of Classification Search
CPC ..... B60S 1/26; B60S 1/08; B60S 1/52; G05D 1/0231; G05D 2201/0213
See application file for complete search history.

(56) References Cited

U.S. PATENT DOCUMENTS

| | | | |
|---|---|---|---|
| 10,173,646 B1* | 1/2019 | Rice .................. | B60S 1/485 |
| 2011/0308768 A1* | 12/2011 | Schwiebert ......... | B08B 1/008 |
| | | | 165/95 |
| 2017/0313288 A1* | 11/2017 | Tippy ................. | B60R 1/0602 |
| 2018/0009418 A1* | 1/2018 | Newman ............. | B60S 1/485 |
| 2018/0208307 A1* | 7/2018 | Boehme .............. | A47L 11/36 |
| 2018/0272958 A1* | 9/2018 | Brouwer ............. | B60R 11/04 |

(Continued)

FOREIGN PATENT DOCUMENTS

KR    10-2004-0082162 A    9/2004

*Primary Examiner* — Peter D Nolan
*Assistant Examiner* — Wae L Louie
(74) *Attorney, Agent, or Firm* — Mintz Levin Cohn Ferris Glovsky and Popeo, P.C.; Peter F. Corless

(57) ABSTRACT

An autonomous vehicle includes a front bumper comprising an opening; a light detection and ranging (LiDAR) sensor comprising a surface exposed to the opening of the front bumper; and a sensor cleaning device configured to remove foreign materials on the surface. The sensor cleaning device includes a wiper configured to move over a surface of a sensor to remove foreign materials from the surface of the sensor; and a movement unit connected to the wiper and comprising at least a linkage system configured to perform folding and unfolding movements, which causes the wiper to reciprocate over the surface of the sensor.

19 Claims, 9 Drawing Sheets

(56) References Cited

U.S. PATENT DOCUMENTS

| | | | |
|---|---|---|---|
| 2019/0092287 A1* | 3/2019 | Leach | B60S 1/603 |
| 2019/0106085 A1* | 4/2019 | Bacchus | B60S 1/56 |
| 2020/0094786 A1* | 3/2020 | Gilbertson | B60S 1/0822 |
| 2020/0108797 A1* | 4/2020 | Nam | B60S 1/08 |
| 2020/0108801 A1* | 4/2020 | Frederick | B25J 5/02 |

* cited by examiner

SENSOR CLEANING DEVICE AND AUTONOMOUS VEHICLE THEREOF

CROSS-REFERENCE TO RELATED APPLICATION

This application claims priority to Korean Patent Application No. 10-2018-0119712, filed on Oct. 8, 2018, which is incorporated herein by reference in its entirety.

BACKGROUND

Field

The present disclosure relates to a sensor cleaning device.

Description of Related Art

Autonomous vehicles, which have been developed rapidly in recent years, utilize a number of sensors together with a global positioning system (GPS) so as to recognize objects in the vicinity of a vehicle, including front-rear and left-right directions.

For example, a plurality of sensors are classified into radio detecting and ranging (RADAR) sensors and light detection and ranging (LiDAR) sensors according to whether they are exposed for operation. The RADAR sensor is a non-exposed type sensor for accurately measuring a distance to an object and a relative speed of the object with respect to an observation position by transmitting and receiving an electromagnetic wave and providing the accurately measured distance and relative speed to a vehicle. Meanwhile, the LiDAR sensor is an exposed type sensor for recognizing a location of a vehicle in conjunction with a GPS and a RADAR and calculating a running direction and a distance from a preceding vehicle by transmitting light, calculating the reflected signal, and recognizing a three-dimensional (3D) shape of an object within a range.

SUMMARY

An embodiment of the present disclosure is directed to a sensor cleaning device capable of continuously maintaining performance of a sensor in an optimal state by removing foreign materials on an externally exposed sensor for emitting light, and particularly, cleaning a sensor surface to maintain the performance of the sensor essential for an autonomous driving operation even in conditions of high sensor contamination such as situations of parking/waiting, driving on a rough road, and driving in rainy/snowy weather, and an autonomous vehicle including the same. More particularly, it relates to an autonomous vehicle having a sensor cleaning device capable of removing foreign materials (i.e., contaminants causing degradation in performance of a sensor) from an exposed outer surface of the sensor through direct cleaning.

Other aspects and advantages of the present invention can be understood by the following description and become apparent with reference to the embodiments of the present invention. Also, the aspects and advantages of the present invention can be realized by the means as claimed and combinations thereof.

In accordance with an embodiment of the present disclosure, a sensor cleaning device including a movement unit configured to perform folding and unfolding movements with power of a drive unit and remove foreign materials from a surface of a sensor due to the folding and unfolding movements.

The drive unit may include a motor for generating power, a gear set for switching the power of the motor to a rotational force, and a rack bar set for converting the rotational force of the gear set into a linear movement so as to allow the movement unit is folded and unfolded. The rack bar set may include a pair of upper rack bar and lower rack bar in which the linear movement of the gear set engaged with the rack gear is opposite to each other.

The movement unit may be located above the sensor when folded, whereas the movement unit may be located below the sensor when unfolded, and the unfolding of the movement unit may be formed in a shape of a rectangular frame which entirely surrounds the sensor.

The movement unit may include a connecting frame having a right-side connecting frame connected to the upper rack bar to be moved therewith and a left-side connecting frame connected to the lower rack bar to be moved therewith, and configured to be moved in a movement direction of the rack bar set, a link mechanism connected to the right-side connecting frame and the left-side connecting frame to form a rectangular frame from which the sensor is exposed, and a wiper frame coupled to a free end of the bending frame.

The link mechanism may include an inter link connected to the right-side connecting frame and the left-side connecting frame, and a joint link connected to the inter link and the wiper frame. The joint link may include a first link connected to the inter link via a rotation shaft, and a second link connected to the first link via a hinge pin and fixed to the wiper frame via a connecting pin.

The rotation shaft may serve as a rotation center for moving the inter link in a clockwise or counterclockwise direction according to linear movement directions of the left-side connecting frame and the right-side connecting frame. A movement of the inter link in the clockwise or counterclockwise direction may form deploy movements of the first link and the second link via the hinge pin. The deploy movements of the first link and the second link may form a vertical movement of the wiper frame.

The wiper frame may include a wiper which is brought into close contact with a surface of the sensor. A washer fluid may be sprayed onto the surface of the sensor from an upward side of the sensor to a downward side thereof, and the washer fluid is sprayed through a washer fluid nozzle disposed at the drive unit.

The sensor may be a light emission sensor or an electromagnetic wave transmission/reception sensor.

In accordance with another embodiment of the present disclosure, an autonomous vehicle includes a sensor cleaning device including a drive unit configured to generate a linear movement of a rack bar set in an opposite direction using power of a motor, and a movement unit configured to perform a vertical movement by folding and unfolding movements due to the linear movement of the rack bar set in the opposite direction, a front bumper having the sensor cleaning device, and a light detection and ranging (LiDAR) sensor exposed to the outside from the front bumper and having a surface from which foreign materials are removed by the vertical movement.

The sensor cleaning device may include a controller, and the controller may implement switching of the vertical movement by controlling forward and reverse rotations of the drive unit. The controller may have a data map in conjunction with a control signal transmitted to the drive unit, and the data map may construct a table for a mileage, an atmospheric temperature, a setting time, a spraying time of a washer liquid, parking/waiting times, driving on a rough road, and driving in bad weather. The controller may be in conjunction with an operation button including a manual button and an automatic button which transmit a signal to the controller.

The sensor cleaning device may be in conjunction with a washer fluid spraying device, and the washer fluid spraying device may spray the washer fluid onto the surface of the LiDAR to be cleaned with a wiper.

DESCRIPTION OF EMBODIMENTS

Embodiments of the present disclosure will be described below in more detail with reference to the accompanying drawings, and these embodiments are examples of the present disclosure and may be embodied in various other different forms by those skilled in the art to which the present disclosure pertains so that the present disclosure is not limited to these embodiments.

In implementations of RADAR sensors and LiDAR sensors, one or more RADAR sensors and one or more LiDAR sensors are installed at an inner portion of a vehicle bumper in which a radio wave or irradiation light does not interfere, and a sensor protection structure is applied to stably protect the RADAR sensor and the LiDAR sensor from an external contamination source.

In particular, in view of the sensor protection structure, a minimized exposure method of forming an opened space in only a light emission region of the LiDAR sensor is applied to the LiDAR sensor due to the nature of the LiDAR sensor operable in an exposed state, whereas an exposure blocking method of using a front protective cover with a heating wire is applied to the RADAR sensor due to the nature of the RADAR sensor operable in a non-exposed state.

However, due to the nature of the LiDAR sensor, the LiDAR sensor is structurally inferior than the RADAR sensor in preventing direct contamination and freezing.

In particular, since an external exposure protection structure of the LiDAR sensor forms an externally exposed state due to the opened space of the light emission region of the LiDAR sensor, the opened space acts as a passage for allowing external contaminants to flow into the LiDAR sensor. Specifically, an inflow of the external contaminants through the opened space becomes severe in situations of parking/waiting, driving on a rough road, and driving in rainy/snowy weather such that contamination and damage to the LiDAR sensor are inevitably accelerated.

Further, the contamination and damage to the LiDAR sensor affect serious effects on an autonomous driving operation such that an operation of an autonomous vehicle may be disabled.

Figure 1:
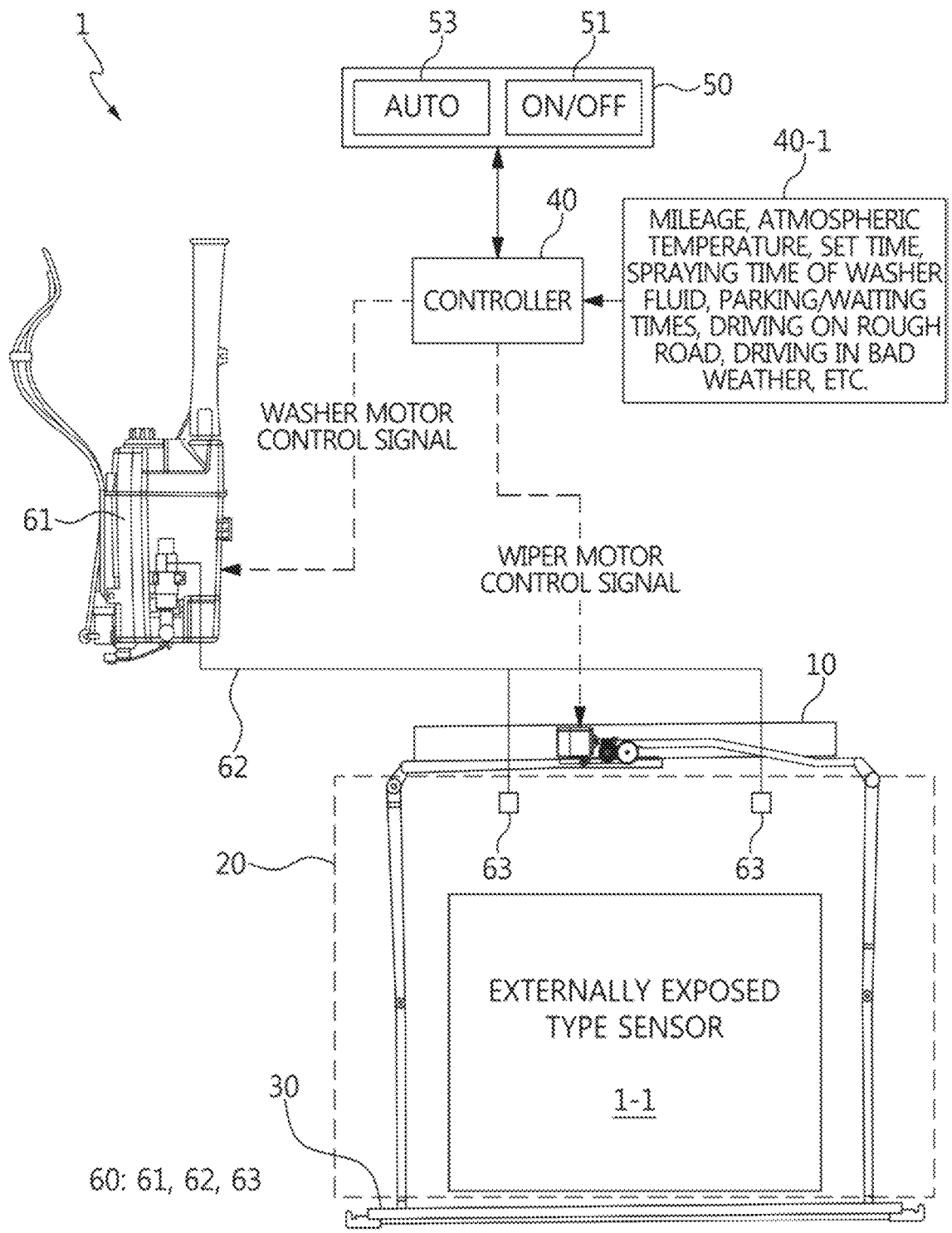
FIG. 1 is a block diagram of a sensor cleaning device according to the present disclosure.

Referring to FIG. 1, a sensor cleaning device 1 includes a drive unit 10, a movement unit 20, a wiper 30, a controller 40, and a washer fluid unit 60 for spraying a washer fluid.

For example, a sensor 1-1 may be an external exposure type sensor such as a light detection and ranging (LiDAR) sensor which is operated in an externally exposed state to be highly contaminated. Alternatively, the sensor 1-1 may also include a radio detecting and ranging (RADAR) to which a radio wave transmission cover on which foreign materials are attachable.

Figure 2:
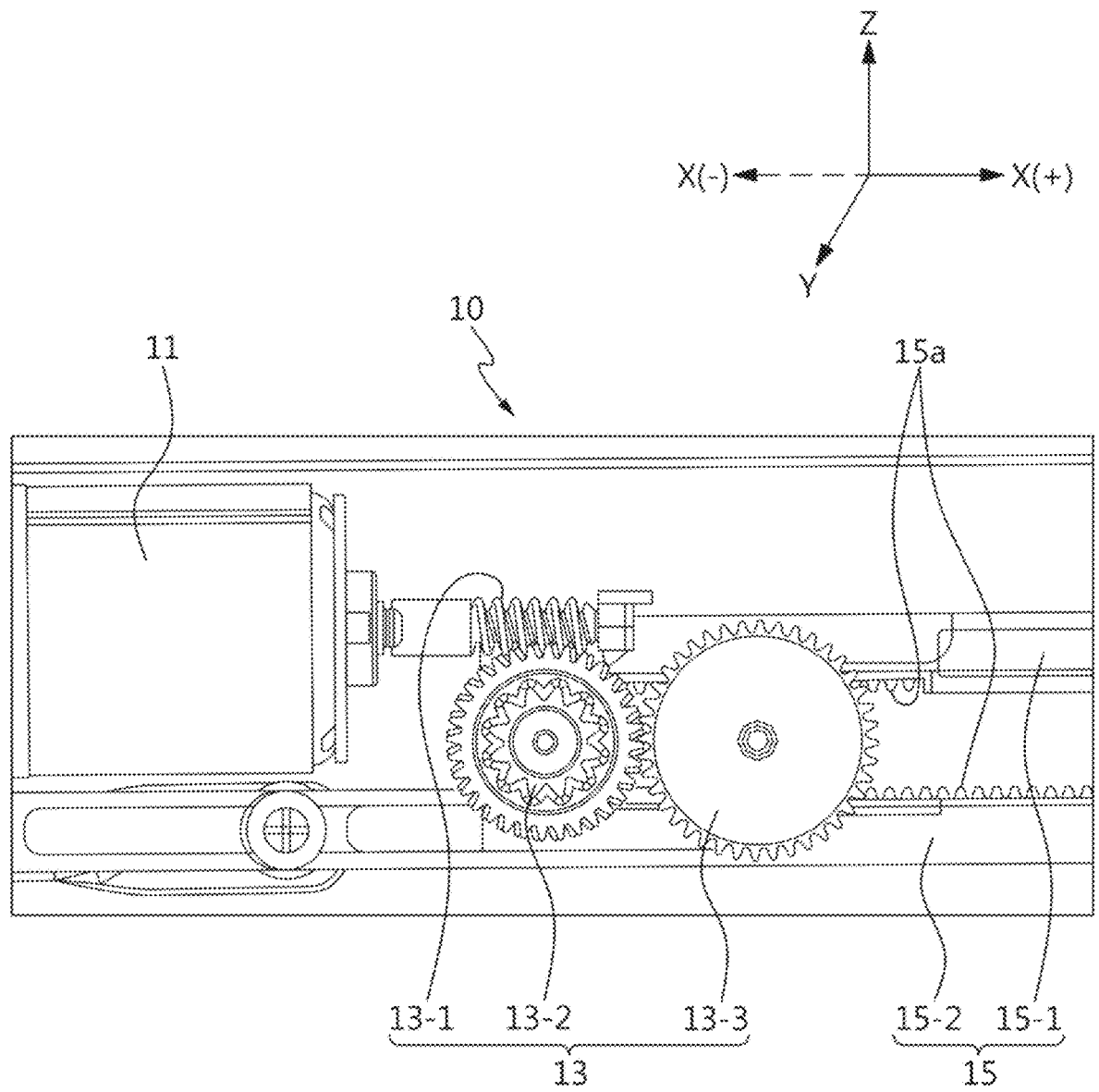
FIG. 2 is a configurational diagram of a drive unit of the sensor cleaning device according to the present disclosure.

For example, the drive unit 10 has a frame structure surrounding the sensor 1-1 and includes a wiper motor operated under the control of the controller 40 to generate a driving force (i.e., a motor 11 of FIG. 2) and a reduction gear (i.e., a gear set 13 of FIG. 2). The movement unit 20 moves in a vertical direction (e.g., z-direction shown in FIG. 2) of the sensor 1-1 by power of the drive unit 10. The wiper 30 directly remove foreign materials from a surface of the sensor 1-1 while moving with the movement unit 20.

For example, the controller 40 generates a control signal for a wiper motor of the drive unit 10 and a control signal for a washer motor of the washer fluid unit 60. In particular, the controller 40 controls a rotation direction of a motor in the drive unit 10 in a forward rotational direction (e.g., which provides force for an upward movement away from a road surface in a state in which the movement unit 20 is installed at a vehicle) and a reverse rotational direction (e.g., which provides force for a downward movement toward the road surface in the state in which the movement unit 20 is installed at the vehicle), which is the opposite direction of the forward rotational direction.

To this end, the controller 40 includes a data map 40-1 for detecting and verifying input information such as a mileage, an atmospheric temperature, a set time, a spraying time of a washer fluid, parking/waiting times, driving on a rough road, driving in bad weather, and the like to construct a table using the input information. In this case, the input information is detected by a plurality of sensors mounted on the vehicle.

In particular, the data map 40-1 includes a timer setting or chart of a motor forward/reverse rotation time depending on a cleaning length of the sensor 1-1. Therefore, the controller 40 interrupts the washer motor at a timer elapsed time in response to the washer motor control signal, switches to an operation time timer of a motor reverse rotation in response to the wiper motor control signal at a timer elapsed time of a motor forward rotation operation time, and interrupts the wiper motor when a cleaning time is elapsed. In this case, a timer setting of the wiper motor is made depending on the cleaning length of the sensor 1-1.

For example, an operation button circuit 50 includes a manual button 51 and an automatic button 53. The manual button 51 transmits ON/OFF signals as operation signals of the controller 40 in a push-button manner in which a pushing by a driver is set to ON and a pushing release by the driver is set to OFF. In response to an ON signal, the controller 40 outputs a motor control signal (e.g., a forward rotation when the manual button 51 is turned ON once, whereas a reverse rotation when the manual button 51 is turned ON twice). The automatic button or automatic triggering circuit 53 allows the controller 40 to automatically output the motor control signal in conjunction with the data map 40-1.

For example, the washer fluid unit 60 includes a washer fluid tank 61, a washer fluid hose 62, and a washer fluid nozzle 63.

The washer fluid tank 61 has a motor for pumping a washer fluid inside the washer fluid tank 61. The washer fluid hose 62 is connected to the washer fluid tank 61 to be used as a passage through which the washer fluid pumped by the motor flows, and the washer fluid hose 62 separates a flow of the washer fluid into at least two positions. The washer fluid nozzle 63 is provided at ends of two branching lines of the washer fluid hose 62 to spray the washer fluid onto a surface of the sensor 1-1. In one embodiment, the washer fluid unit 60 may have the same configuration as the washer fluid system typically applied to a vehicle.

Meanwhile, FIGS. 2 to 5 illustrate detailed configurations of the drive unit 10, the movement unit 20, and the wiper 30.

Referring to FIG. 2, the drive unit 10 includes the motor 11, the gear set 13, and a rack bar set 15.

Specifically, the motor 11 is disposed in an inner space of a housing constituting an overall appearance and is rotated forward or reversely in response to the wiper motor control signal of the controller 40. The motor 11 may be a brushless direct current (BLDC) three-phase motor or a step motor. In this case, the housing is used as a mounting and fixing portion of the sensor cleaning device 1 by being bolted or welded to a coupling part.

Specifically, the gear set 13 is disposed in the inner space of the housing and includes a motor gear 13-1, a driving gear 13-2, and a driven gear 13-3. The motor gear 13-1 and the driving gear 13-2 constitute a worm gear so that the motor gear 13-1 directly connected to a motor shaft of the motor 11 serves as a worm, whereas the driving gear 13-2 engaged with the motor gear 13-1 It serves as a worm wheel. Therefore, a rotation direction of the motor 11 is switched to a rotation direction of the driving gear 13-2 through the motor gear 13-1.

In particular, the driven gear 13-3 is configured in a double gear structure of large/small diameter gears, and the large diameter gear is engaged with the driving gear 13-2 to receive a rotational force, whereas the small diameter gear is engaged with rack gears 15a of an upper rack bar 15-1 and a lower rack bar 15-2 to linearly move the upper rack bar 15-1 and the lower rack bar 15-2 in opposite directions.

Specifically, in the inner space of the housing, the rack bar set 15 is configured such that the rack gear 15a engaged with the driven gear 13-3 is formed, the upper rack bar 15-1 and the lower rack bar 15-2 are paired and are disposed with a gap to face each other via the rack gear 15a engaged with the driven gear 13-3, thereby being linearly moved in opposite directions depending on a rotation direction of the driven gear 13-3.

For example, the upper rack bar 15-1 is linearly moved in a right direction (i.e., a direction away from the motor 11 in an x (+) direction of an x-y-z coordinate system of FIG. 2) and the lower rack bar 15-2 is linearly moved in a left direction (i.e., a direction away from the motor 11 in an x (−) direction of the x-y-z coordinate system of FIG. 2) to form an upward movement of the movement unit 20.

Meanwhile, the upper rack bar 15-1 is linearly moved in the left direction (i.e., a direction approaching the motor 11 in the x (+) direction of the x-y-z coordinate system of FIG. 2) and the lower rack bar 15-2 is linearly moved in the left direction (i.e., a direction approaching the motor 11 in the x (+) direction of the x-y-z coordinate system of FIG. 2) to form a downward movement of the movement unit 20.

Figure 3:
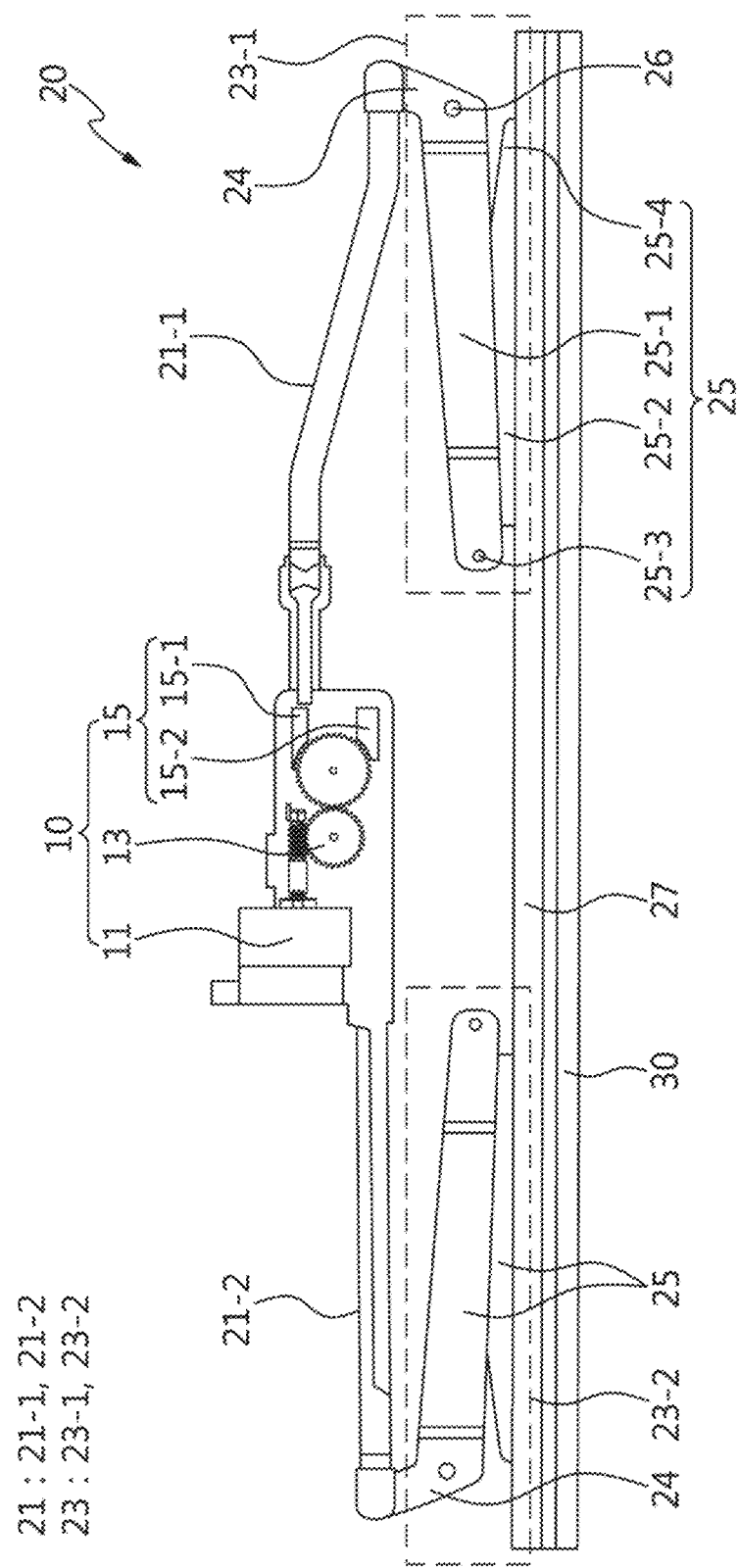
FIG. 3 is a configurational diagram of a movement unit of the sensor cleaning device according to the present disclosure.
Figure 4:
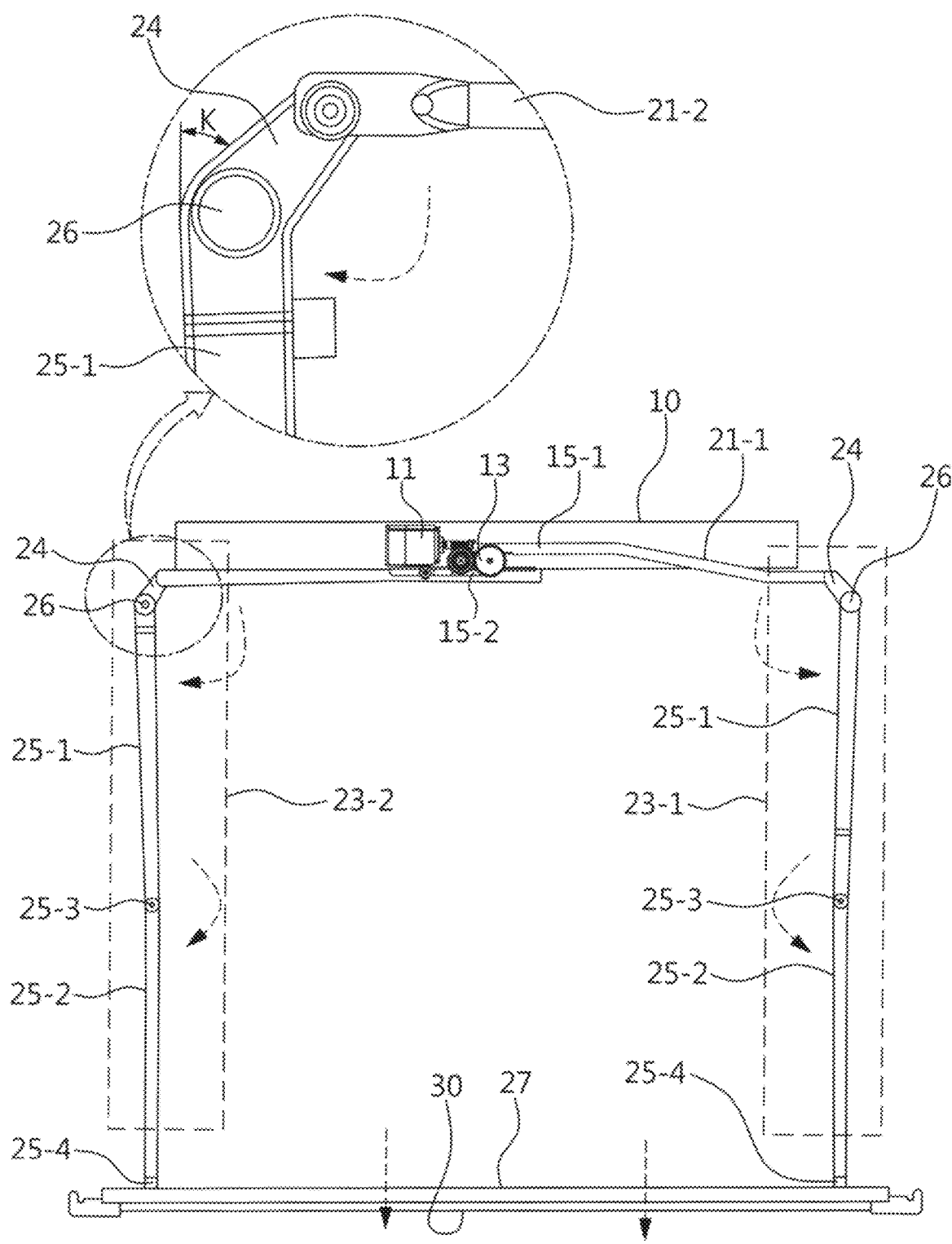
FIG. 4 is a diagram illustrating an unfolded state of the movement unit according to the present disclosure.

Referring to FIGS. 3 and 4, the movement unit 20 includes a pair of connecting frames or connecting rods 21, link mechanisms 23, and a wiper frame 27 to form a square shape frame in an unfolded state due to the downward movement.

Specifically, the connecting frame 21 includes a right-side connecting frame or connecting rod 21-1 and a left-side connecting frame or connecting rod 21-2. The right-side connecting frame 21-1 is fixed to an end portion of the upper rack bar 15-1 to be moved in a direction equal to a movement direction of the upper rack bar 15-1, and the left-side connecting frame 21-2 is fixed to an end portion of the lower rack bar 15-2 to be moved in a direction equal to a movement direction of the lower rack bar 15-2.

Therefore, the right-side connecting frame 21-1 and the left-side connecting frame 21-2 form a square upper side of the square shape frame of the movement unit 20.

Specifically, the link mechanisms 23 includes a right-side link mechanism 23-1 and a left-side link mechanism 23-2. An end portion of one side of the right-side link mechanism 23-1 is connected to the right-side connecting frame 21-1, and an end portion of the other end of the right-side link mechanism 23-1 is connected to the wiper frame 27. An end portion of one side of the left-side link mechanism 23-2 is connected to the left-side connecting frame 21-2, and an end portion of the other end of the left-side link mechanism 23-2 is connected to the wiper frame 27.

Therefore, the right-side link mechanism 23-1 and the right-side link mechanism 23-1 form square left/right sides of the square shape frame of the movement unit 20.

In particular, each of the right-side link mechanism 23-1 and the left-side link mechanism 23-2 includes a joint link set 25 having an inter link 24 and first and second links 25-1 and 25-2, a hinge pin 25-3, a connecting pin 25-4, and a rotation shaft or pivot joint 26 as components.

For example, the inter link 24 is formed in a bent or curved structure having an acute inclination angle K with respect to a first link 25-1. The right-side inter link 24 is connected to the right-side connecting frame 21-1 by a pin and is coupled to the first link 25-1 of the joint link set 25 and the rotation shaft 26 to be integrated with the right-side connecting frame 21-1. The left side inter link 24 is connected to the left-side connecting frame 21-2 by a pin and is coupled to the first link 25-1 of the joint link set 25 and the rotation shaft 26 to be integrated with the left-side connecting frame 21-2.

Further, the joint link set 25 includes the first link 25-1 and the second link 25-2. The first link 25-1 is connected to each of left and right connecting rods via the inter link 24 and is connected to the second link 25-2 via the hinge pin 25-3. The second link 25-2 is fixed to and integrated with the wiper frame 27 via the connecting pin 25-4 in a state of being connected to the first link 25-1.

Specifically, the wiper frame 27 is configured in one-direction opened cross section structure (e.g., a "C" cross-sectional structure) for detachment of the wiper 30, and the second link 25-2 is connected to left and right end portions of the wiper frame 27 via the connecting pin 25-4. Therefore, the wiper frame 27 forms a square lower side of the square shape frame of the movement unit 20.

Specifically, the hinge pin 25-3 serves as a rotational center of each of the first and second links 25-1 and 25-2 to allow unfolding and folding of the first and second links 25-1 and 25-2. The connecting pin 25-4 serves as a fixed point of each of the second link 25-2 and the wiper frame 27 so as to allow the second link 25-2 and the wiper frame 27 to be descended or ascended by the unfolding or folding of the first and second links 25-1 and 25-2.

The rotation shaft 26 serves as a rotational center of the inter link 24 pulled or pushed in a movement direction of the left/right-side connecting frame 21-2 and 21-1 to allow the first and second links 25-1 and 25-2 to be unfolded or folded through a rotation of the inter link 24.

In one implementation, the pivot joint 26 is located at a fixed location with respect to the drive unit 10, the bumper and the sensor of the vehicle. Further, the angle K formed by the inter link 24 and the first link 25-1 is not changed when the links move.

Figure 5:
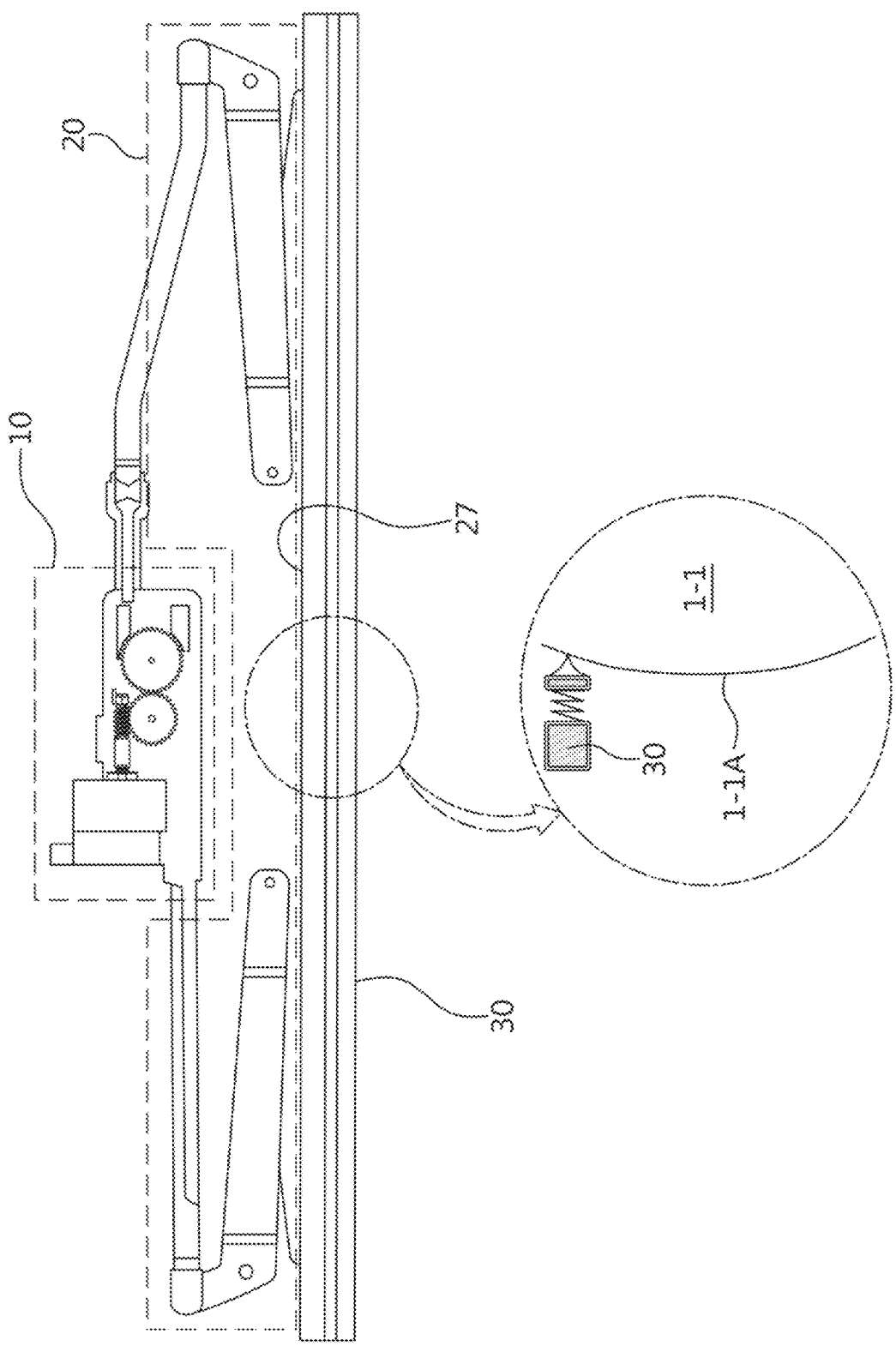
FIG. 5 is a configurational diagram of a wiper of the sensor cleaning device according to the present disclosure.

Referring to FIG. 5, the wiper 30 is coupled to the wiper frame 27 by being fitted in one-direction opened cross section structure (e.g., a "C" cross section structure) of the wiper frame 27. In particular, a configuration of the wiper 30 may be a typical wiper. However, there is a difference in that a flexible connector of an elastic body is applied between a cleaning portion and a frame constituting a coupler so as to maintain adhesion with a curvature surface of the sensor cover 1-1A while the wiper 30 is vertically moved along a curvature type sensor cover 1-1A of the sensor 1-1.

Figure 6:
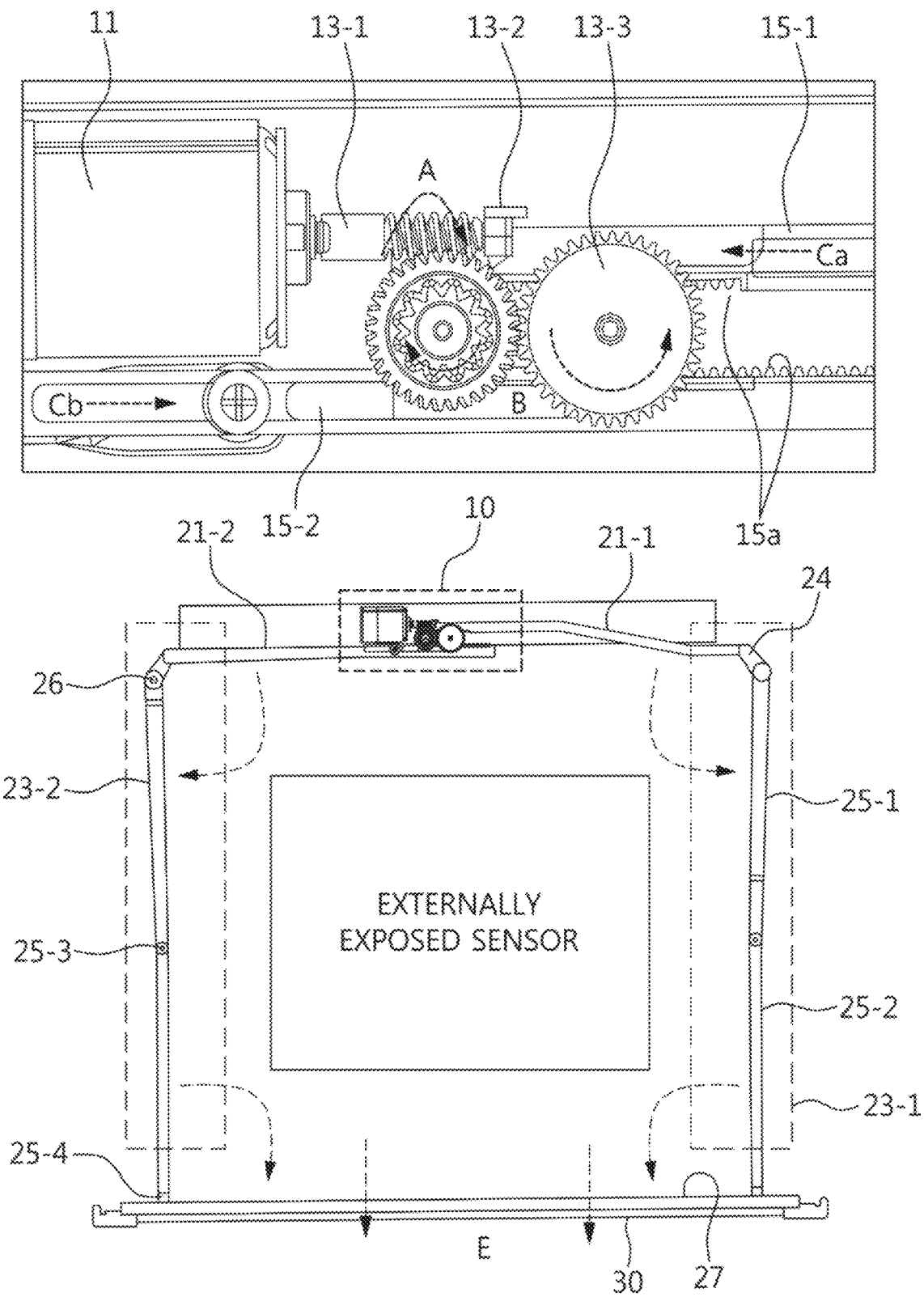
FIG. 6 is a diagram illustrating a downward movement operation of the sensor cleaning device according to the present disclosure.
Figure 7:
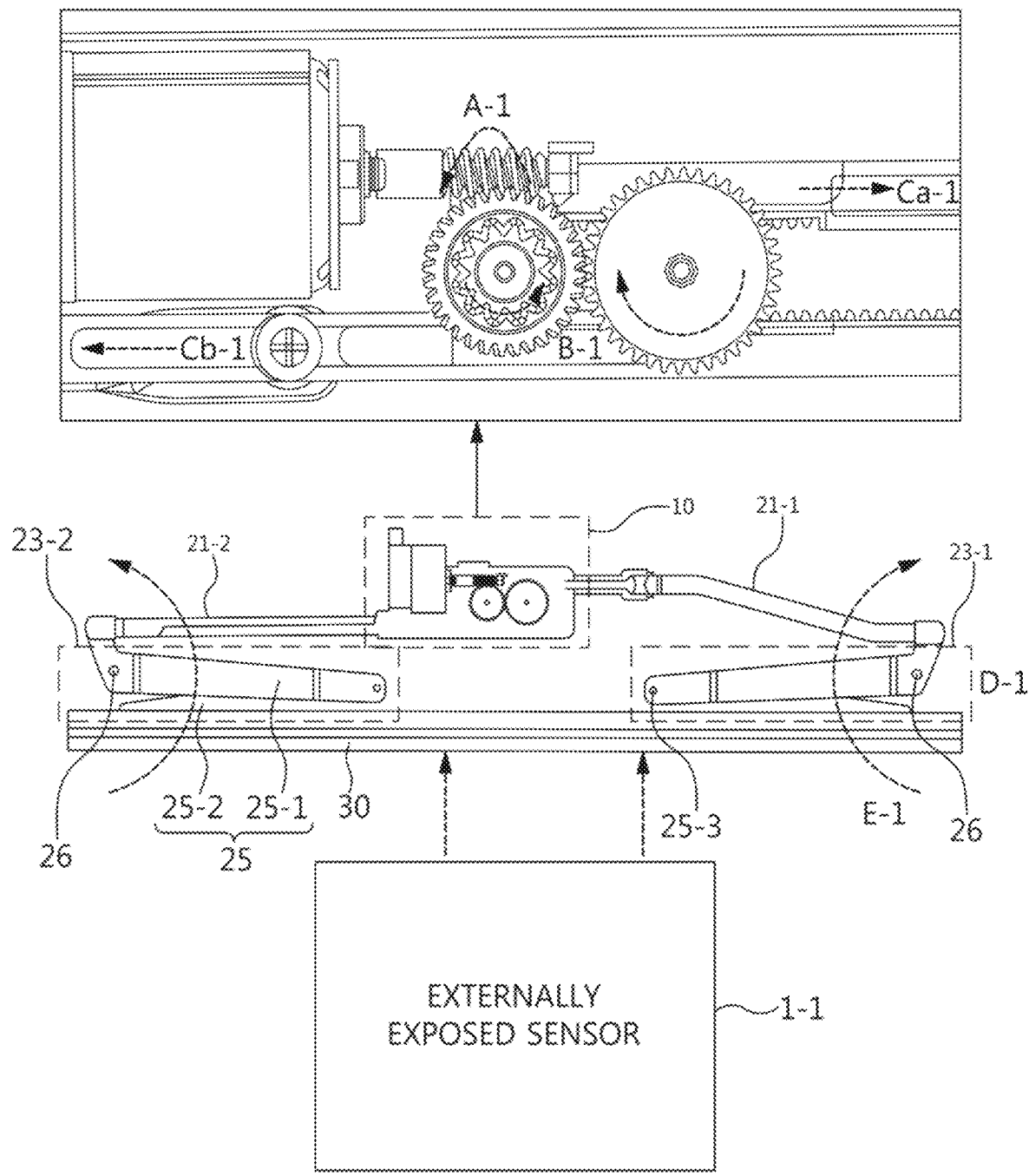
FIG. 7 is a diagram illustrating an upward movement operation of the sensor cleaning device according to the present disclosure.

Meanwhile, FIGS. 6 and 7 illustrate an operation of the sensor cleaning device 1 vertically moving so as to clean the sensor 1-1.

FIG. 6 is a diagram illustrating a downward movement of each of the movement unit 20 and the wiper 30 by the drive unit 10, and a description will be made in a case in that, in response to an ON operation of the manual button 51 or the automatic button 53, the controller 40 outputs the washer motor control signal and the wiper motor control signal so that the washer fluid nozzle 63 sprays the washer fluid onto the sensor cover 1-1A and the motor 11 is rotated forward by the operation of the timer for a motor forward rotation operation time.

First, the forward rotation of the motor 11 is switched to a rotation of the driving gear 13-2 via the motor gear 13-1, and the rotation of the driving gear 13-2 is switched to a rotation of the driven gear 13-3 which is configured in a double gear structure of large/small diameter gears.

Then, the small diameter gear integrated with the large diameter gear of the driven gear 13-3 is rotated in a state of being engaged with the rack gear 15a of the upper/lower rack bars 15-1 and 15-2. As a result, the upper rack bar 15-1 and the lower rack bar 15-2 are linearly moved in opposite directions (i.e., in directions away from each other).

Subsequently, the right-side connecting frame 21-1 is pulled by a pulling movement of the upper rack bar 15-1 and, simultaneously, the left-side connecting frame 21-2 is pulled by a pulling movement of the lower rack bar 15-2.

Then, when the inter links 24 are unfolded by the pulling movements of the left/right-side connecting frames 21-2 and 21-1 via the rotation shaft 26 in a state of being connected to the left/right-side connecting frames 21-2 and 21-1, and a manual button and an automatic button which transmit a signal to the controller, and the inter links 24 are rotated in a clockwise and counterclockwise direction about the rotation shaft 26, respectively.

Subsequently, the first and second links 25-1 and 25-2 are unfolded via the hinge pin 25-3 while receiving a force applied from the inter link 24, thereby beginning a downward movement with the wiper blade 27.

Then, a wiper 30 is moved downward with the wiper blade 27 while removing foreign materials wet with the washer fluid in a state of being brought into contact with the sensor 1-1. In this case, the downward movement of the wiper 30 is continued until the first and second links 25-1 and 25-2 are completely unfolded and then the downward movement thereof is terminated.

Meanwhile, FIG. 7 is a diagram illustrating an upward movement of each of the movement unit 20 and the wiper 30 by the drive unit 10, and a description will be made in a case in that, after the timer of the motor forward rotation operation time is elapsed, the controller 40 is reversely rotated by the operation of the timer for a motor reverse rotation operation time.

First, the reverse rotation of the motor 11 is switched to rotations of the large/small diameter gears of the driving gear 13-2 via the motor gear 13-1 and the driving gear 13-2, and the small diameter gear of the driven gear 13-3 moves the upper rack bar 15-1 and the lower rack bar 15-2 in opposite directions (i.e., in direction approaching each other) via the rack gear 15a.

Then, the right-side connecting frame 21-1 is pushed by a pushing movement of the upper rack bar 15-1 and, simultaneously, the left-side connecting frame 21-2 is pushed by a pushing movement of the lower rack bar 15-2.

Subsequently, when the inter links 24 are folded by the pushing movements of the left/right-side connecting frames 21-2 and 21-1 via the rotation shaft 26 in a state of being connected to the left/right-side connecting frames 21-2 and 21-1, and the inter links 24 are rotated in counterclockwise and clockwise directions about the rotation shaft 26, respectively.

As a result, the first and second links 25-1 and 25-2 are folded via the hinge pin 25-3 while receiving a force applied from the inter link 24, thereby beginning an upward movement with the wiper blade 27.

Then, the wiper 30 is moved upward with the wiper blade 27 while removing foreign materials wet with the washer fluid in the state of being brought into contact with the sensor 1-1. In this case, the upward movement of the wiper 30 is continued until the first and second links 25-1 and 25-2 are completely folded and then the upward movement thereof is terminated.

Actually, the operation of the wiper 30 for cleaning the sensor 1-1 is repeatedly continued until the operation of the sensor cleaning device 1 is stopped due to an OFF operation of the manual button 51 or a timer time set by the automatic button 53 is elapsed.

Figure 8:
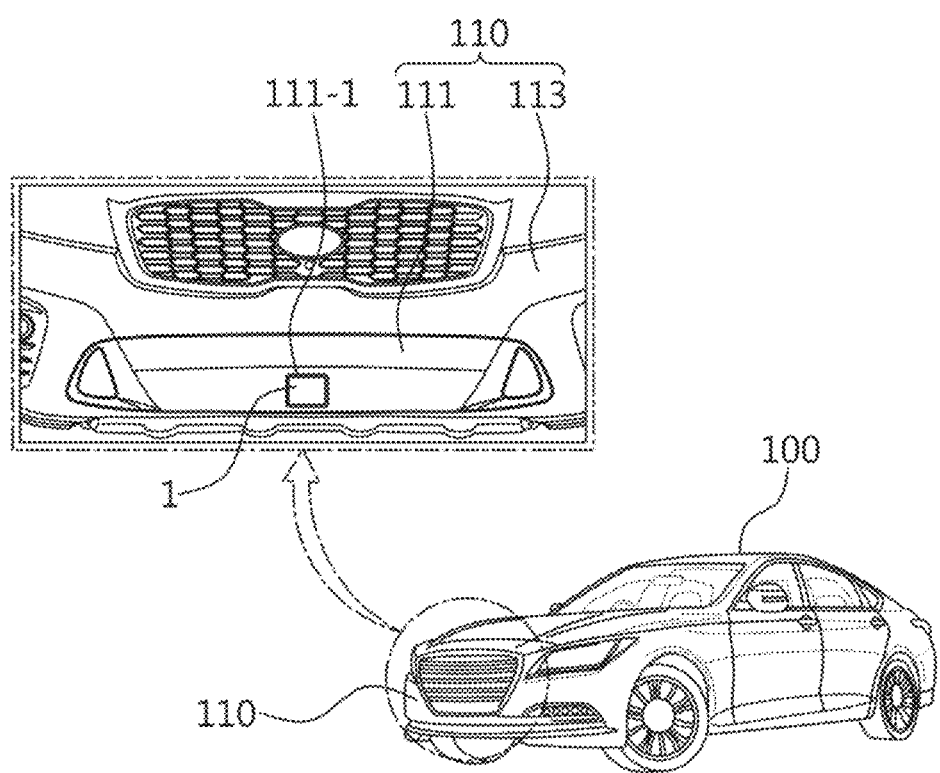
FIG. 8 is a diagram illustrating an example of an autonomous vehicle to which the sensor cleaning device according to the present disclosure is applied.

Meanwhile, FIG. 8 illustrates an example of an autonomous vehicle 100. The autonomous vehicle 100 includes a LiDAR 130 provided at a front bumper 110 and the sensor cleaning device 1 mounted on the LiDAR 130.

Specifically, the sensor cleaning device 1 is identical to the sensor cleaning device 1 described with reference to FIGS. 1 to 7. However, the sensor cleaning device 1 shown in FIG. 7 has a difference in that the housing of the drive unit 10 is bolted or welded to a bumper assembly 111 of the front bumper 110, the controller 40 is replaced with an engine electronic control unit (ECU) for a vehicle, the washer fluid unit 60 is replaced with a washer fluid spraying device 120 for a vehicle configured to spray a washer fluid onto front/rear window in conjunction with a wiper system of the vehicle, and the sensor 1-1 is replaced with the LiDAR 130. Further, in the sensor cleaning device 1, the operation button 50 including the manual button 51 and the automatic button 53 is installed at a cluster of a driver seat or toward a steering wheel of the autonomous vehicle 100.

Specifically, the front bumper 110 includes a bumper assembly 111 and a bumper cover 112. In particular, the bumper assembly 111 passes through a sensor hole 111-1 to which the LiDAR 130 is coupled in a state of being exposed to the outside, and the sensor cleaning device 1 is coupled to a periphery of the sensor hole 111-1 using a housing.

Figure 9:
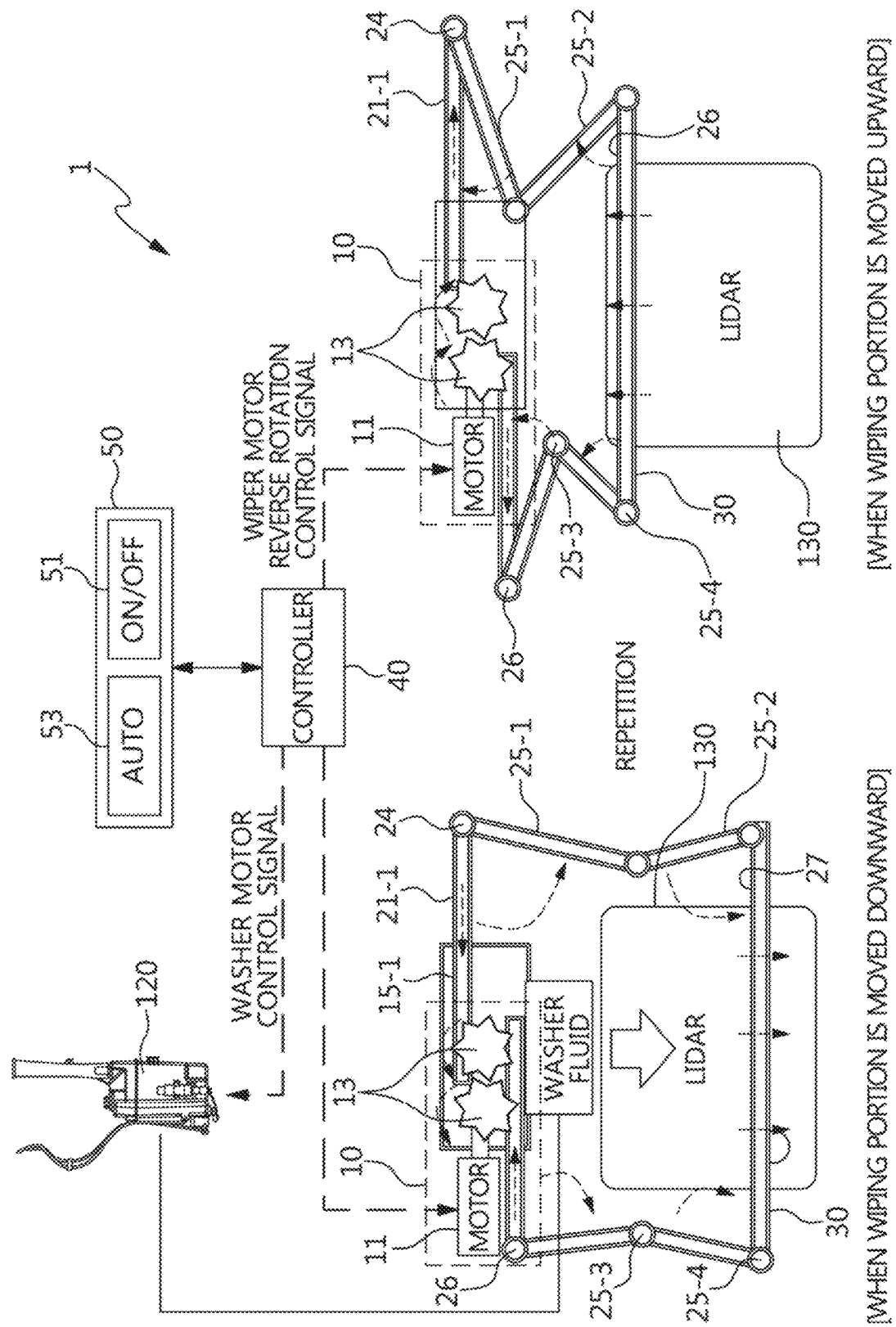
FIG. 9 is a diagram illustrating an operation state of the sensor cleaning device in the autonomous vehicle according to the present disclosure.

Referring to FIG. 9, the downward movement and the upward movement of the sensor cleaning device 1 initiated by the operation of the operation button circuit 50 in the autonomous vehicle 100 are illustrated. As shown in the drawing, when the manual button 51 or the automatic button 53 is operated, the controller 40 operates the washer fluid spraying device 120 in response to the washer motor control signal to spray the washer fluid onto the LiDAR 130 and, simultaneously, moves downward the sensor cleaning device 1 by controlling the wiper motor to be rotated forward.

Referring to the downward movement of the sensor cleaning device 1 illustrated in a left side of FIG. 9, the forward rotation of the motor 11 causes a linear pulling movement of each of the upper/lower rack bars 15-1 and 15-2 via the gear set 13 and causes pulling of the left/right-side connecting frames 21-2 and 21-1 such that the downward movement of the sensor cleaning device 1 is converted into a clockwise rotation of the inter link 24 via the rotation shaft 26.

Then, unfolding of the first and second links 25-1 and 25-2 connected to the inter link 24 moves the wiper frame 27 downward, and the wiper 20 is moved downward with the wiper frame 27 while removing foreign materials wet with the washer fluid from a surface of the LiDAR 130.

Further, referring to the upward movement of the sensor cleaning device 1 illustrated in a right side of FIG. 9, the reverse rotation of the motor 11 causes a linear pushing movement of each of the upper/lower rack bars 15-1 and 15-2 via the gear set 13 and causes pushing of the left/right-side connecting frames 21-2 and 21-1 such that the upward movement of the sensor cleaning device 1 is converted into a counterclockwise rotation of the inter link 24 via the rotation shaft 26.

Then, folding of the first and second links 25-1 and 25-2 connected to the inter link 24 moves the wiper frame 27 upward, and the wiper 20 is moved upward with the wiper frame 27 while removing foreign materials wet with the washer fluid from the surface of the LiDAR 130.

Then, the sensor cleaning device 1 is repeatedly moved upward and downward to clean the surface of the LiDAR 130, and then the movement of the sensor cleaning device 1 is stopped. Therefore, the upward/downward movements of the sensor cleaning device 1 of FIG. 8 is the same as the upward/downward movements of the sensor cleaning device 1 of FIGS. 5 and 6.

As described above, the sensor cleaning device 1 applied to the autonomous vehicle 100 according to embodiments of the present embodiment includes the drive unit 10 for generating a linear movement opposite a direction of the rack bar set 15 using the power of the motor 11, and the movement unit 20 for generating a vertical movement so as to remove foreign materials on a surface of the sensor 1-1 using folding and unfolding movements of the link mechanism 23 due to the linear movement of the rack bar set 15 in the opposite direction, thereby being capable of maintaining optimal performance of a sensor in an optimal state by removing the foreign materials on the sensor 1-1, and particularly, cleaning a sensor surface to maintain the performance of the sensor essential for an autonomous driving operation even in conditions of high sensor contamination such as situations of parking/waiting, driving on a rough road, and driving in rainy/snowy weather. The autonomous vehicle of the present disclosure implements the following actions and effects by applying a sensor cleaning device.

First, a contamination of an externally exposed sensor required for external exposure due to emission of light is fundamentally solved. Second, since foreign materials of a sensor surface are directly cleaned and thus an optimal performance of a sensor is maintained, a sensor problem does not occur even in conditions of high sensor contamination such as situations of parking/waiting, driving on a rough road, and driving in rainy/snowy weather. Third, contamination and damage to an expensive LiDAR sensor which is an externally exposed sensor is prevented such that it is possible to reduce costs due to replacement and repair. Fourth, contamination of the LiDAR sensor which is a light emitting sensor is resolved such that it is possible to secure stable sensor information of an autonomous vehicle which is becoming more important. Fifth, an autonomous vehicle in which the use of the LiDAR sensor is inevitable can implement a problem-free operation for performing a core function.

The embodiments disclosed herein and the accompanying drawings are used only for the purpose of easily describing the technical spirit of the present invention and are not intended to limit the scope of the present invention defined in the appended claims. Therefore, those skilled in the art will appreciate that various modifications and equivalent other embodiments can be derived without departing from the scope of the present invention.

What is claimed is:

1. A sensor cleaning device, comprising:
   a wiper configured to move over a surface of a sensor to remove foreign materials from the surface of the sensor;
   a movement unit connected to the wiper and comprising at least a linkage system configured to perform folding and unfolding movements, which causes the wiper to reciprocate over the surface of the sensor; and
   a drive unit that includes a motor, and a pair of upper rack bar and lower rack bar configured to be linearly moved in opposite directions by power of the motor for the folding and unfolding movements of the linkage system the movement unit,
   wherein the at least a linkage system of the movement unit includes:
      a right-side linkage mechanism connected to a right-side connecting frame and a left-side linkage mechanism connected to a left-side connecting frame; and
      a wiper frame coupled to a free end of the right-side and left-side linkage mechanisms such that the right-side connecting frame, the left-side connecting frame, the right-side linkage mechanism, the left-side linkage mechanism and the wiper frame are configured to form a rectangular shape in an unfolding state to define an opening through which the sensor is exposed.

2. The sensor cleaning device of claim 1, wherein the motor and a rack bar set are connected via a gear set;
   wherein the gear set is configured to covert the power of the motor into a rotational force to switch the rotational force to the linear movements of the upper rack bar and the lower rack bar in the opposite directions.

3. The sensor cleaning device of claim 2, wherein each of the upper rack bar and the lower rack bar is engaged with the gear set via a rack gear.

4. The sensor cleaning device of claim 1, wherein:
   the right-side connecting frame is connected to the upper rack bar to be moved therewith, and the left-side connecting frame is connected to the lower rack bar to be moved therewith.

5. The sensor cleaning device of claim 1, wherein each of the linkage mechanisms includes:
   an inter link connected to one of the right-side connecting frame and the left-connecting frame;
   a first link connected to the inter link; and
   a second link connected to the first link via a hinge pin and fixed to the wiper frame via a connecting pin.

6. The sensor cleaning device of claim 5, wherein the first link and the inter link are configured to pivot together about a rotation shaft.

7. The sensor cleaning device of claim 6, wherein the rotation shaft is configured to serve as a rotation center for moving the inter link in a clockwise or counterclockwise direction depending on linear movement directions of each of the left-side connecting frame and the right-side connecting frame.

8. The sensor cleaning device of claim 7, wherein a movement of the inter link in the clockwise or counterclockwise direction is configured to cause deploy movements of the first link and the second link via the hinge pin.

9. The sensor cleaning device of claim 8, wherein the deploy movements of the first link and the second link is configured to cause a vertical movement of the wiper frame.

10. The sensor cleaning device of claim 1, wherein the wiper is attached to the wiper frame and the wiper contacts the surface of the sensor.

11. The sensor cleaning device of claim 1, further comprising a washer fluid nozzle configured to spray washer fluid onto the surface of the sensor.

12. The sensor cleaning device of claim 11, wherein the washer fluid nozzle is disposed at the drive unit to spray the washer fluid from an upward side of the sensor to a downward side thereof.

13. The sensor cleaning device of claim 1, wherein the sensor comprises a light emission sensor or an electromagnetic wave transmission/reception sensor.

14. An autonomous vehicle, comprising:
   a front bumper comprising an opening;
   a light detection and ranging (LiDAR) sensor comprising a surface exposed to the opening of the front bumper; and
   the sensor cleaning device of claim 1 configured to remove foreign materials on the surface.

15. The autonomous vehicle of claim 14, wherein the sensor cleaning device includes a controller configured to implement switching of the vertical movement by controlling forward and reverse rotations of the drive unit.

16. The autonomous vehicle of claim 15, wherein:
   the controller has a data map in conjunction with a control signal transmitted to the drive unit; and
   the data map comprises a table for a mileage, an atmospheric temperature, a setting time, a spraying time of a washer liquid, parking/waiting times, driving on a rough road, and driving in bad weather.

17. The autonomous vehicle of claim 15, further comprising a manual button and an automatic button which are configured to transmit a signal to the controller.

18. The autonomous vehicle of claim 14, further comprising a washer fluid spraying device configured to spray washer fluid onto the surface of the LiDAR to be cleaned with the wiper.

19. The autonomous vehicle of claim 18, wherein the wiper is provided in the movement unit.

* * * * *